United States Patent
Knappe et al.

(10) Patent No.: US 7,203,211 B2
(45) Date of Patent: Apr. 10, 2007

(54) DEVICE AND METHOD FOR THE OPTICALLY EXCITING LASER-ACTIVE CRYSTALS WITH POLARIZATION-DEPENDENT ABSORPTION

(75) Inventors: Ralf Knappe, Kaiserslautern (DE); Achim Nebel, Trippstadt (DE)

(73) Assignee: Lumera Laser GmbH, Kaiserslautern (DE)

( * ) Notice: Subject to any disclaimer, the term of this patent is extended or adjusted under 35 U.S.C. 154(b) by 323 days.

(21) Appl. No.: 10/500,037

(22) PCT Filed: Dec. 18, 2002

(86) PCT No.: PCT/EP02/14504

§ 371 (c)(1),
(2), (4) Date: Jun. 23, 2004

(87) PCT Pub. No.: WO03/061085

PCT Pub. Date: Jul. 24, 2003

(65) Prior Publication Data

US 2005/0069009 A1    Mar. 31, 2005

(30) Foreign Application Priority Data

Jan. 16, 2002    (DE) .............................. 102 01 383

(51) Int. Cl.
*H01S 3/10* (2006.01)
*H01S 5/00* (2006.01)
(52) U.S. Cl. ..................... 372/27; 372/49.01
(58) Field of Classification Search ............ 372/27

See application file for complete search history.

(56) References Cited

U.S. PATENT DOCUMENTS

| 5,036,520 | A | | 7/1991 | Bowman et al. |
| 5,517,516 | A | | 5/1996 | Marshall et al. |
| 5,999,544 | A | | 12/1999 | Petersen |
| 6,047,014 | A | | 4/2000 | Hyuga et al. |
| 6,137,820 | A | * | 10/2000 | Maag et al. ............... 372/108 |

FOREIGN PATENT DOCUMENTS

| DE | 100 12 480 A1 | | 9/2001 |
| JP | 04-137775 | | 5/1992 |
| JP | 10-261825 | | 9/1998 |
| JP | 2000-307179 | | 11/2000 |
| JP | 2000307179 | * | 11/2000 |
| WO | WO 96/34436 | | 10/1996 |
| WO | WO 96/38749 | | 12/1996 |
| WO | WO 98/35411 | | 8/1998 |
| WO | WO 00/31842 | | 6/2000 |

* cited by examiner

*Primary Examiner*—Armando Rodriguez
(74) *Attorney, Agent, or Firm*—Straub & Pokotylo; Michael P. Straub (57) ABSTRACT

A device for the optical excitation of laser-active crystals with a diode laser (1) is disclosed. The diode laser (1) generates pump radiation (2), and the laser-active crystal (14) is arranged in a solid-state laser or solid-state laser amplifier. The laser-active crystal (14) has an axis (C) with strong absorption and an axis (A) with weak absorption. The pump radiation (2) from the diode laser (1) is substantially polarised linearly in a privileged polarisation direction. The device is configured in such a way that the pump radiation (2) is injected into the laser-active crystal (14) with a polarisation direction which is oriented parallel to the weak-absorption axis (A). The polarisation of the pump radiation in the vicinity of the laser-active crystal is oriented parallel relative to the weak-absorption axis.

14 Claims, 7 Drawing Sheets

DEVICE AND METHOD FOR THE OPTICALLY EXCITING LASER-ACTIVE CRYSTALS WITH POLARIZATION-DEPENDENT ABSORPTION

The invention relates to a device for the optical excitation of laser-active crystals with polarisation-dependent absorption, the device having a diode laser which generates pump radiation, and a laser-active crystal which is arranged in a solid-state laser or solid-state laser amplifier, the laser-active crystal having an axis with strong absorption and an axis with weak absorption.

The invention furthermore relates to a method for the optical excitation of laser-active crystals with a diode laser, a laser-active crystal being arranged in a solid-state laser or solid-state laser amplifier.

Diode-pumped solid-state lasers, in which the diode-laser light is injected as pump radiation into the laser-active crystal from the end face, have a high efficiency for converting the power of the pump light, which excites the laser-active crystal, into power of the laser radiation which is generated. The lasers are preferably used for generating laser light with low and medium powers (that is to say with output powers of about 1 to 100 W). Furthermore, these lasers are particularly advantageous when the generated laser radiation is intended to have a good beam quality and a high brilliance, that is to say a high spatial power density. Owing to these advantages, this type of laser is successfully used in many fields of research and technology.

The described excitation of the laser crystal with the diode-laser radiation, which is referred to as longitudinal excitation or end-pumping, allows optimum overlap of the volume which is optically excited in the crystal and the volume of the modes of the laser resonator. A greatest possible part of the pump radiation absorbed in the laser-active crystal is therefore converted into laser radiation.

The resonator modes determine the spatial properties of the laser beam which is generated. The latter typically has a circular or elliptical cross section. The transverse fundamental mode of the resonator with a Gaussian intensity distribution is preferred. In order to achieve a high spatial overlap between the pumped crystal volume and the resonator modes, the distribution of the diode-laser radiation must first be spatially shaped so that the intensity distribution resulting from this can subsequently be imaged onto the spatial structure of the modes of the laser resonator.

High-power diode lasers which generate pump powers of typically in excess of 4 watts are used for the excitation. According to the state of the art they consist of many individual emitters, which are arranged beside one another to form a so-called "bar" or "array" ("diode laser bar"). The emission geometry of such a pump-light source consisting of a diode laser is very different from a circular intensity distribution. The polarised pump radiation is emitted from the diode-laser bar in a linear cross section with a height of typically 1 µm and a width of typically 10 mm. The emitted intensity distribution is almost Gaussian, although strongly divergent in the height direction of the emitting face ("fast axis"), and highly structured (diffraction factor $M^2>1000$) along the width of the emitting face ("slow axis"). The radiation emitted by such diode lasers is thus unsuitable for direct longitudinal excitation of a solid-state laser. Suitable beam shaping of the pump light emitted by a laser bar is therefore necessary.

The beam shaping of the radiation coming from the diode laser is preferably carried out using optical fibres with a diameter of from 0.2 to 1 mm. The pump radiation from the diode laser is delivered to the laser-active crystal by these light guides. There are several options for injecting the diode-laser radiation into the optical fibres. Specification WO 98/35411 discloses at least one laser diode and a waveguide, which is arranged in front of the emitting face of the laser diode. The radiation is injected into the waveguide by suitable optical means, and can then be sent in a shaped form by the waveguide for further processing. Waveguides are likewise described in Specification WO 96/38749. Specification DE 100 12 480 discloses the use of micro-optics in order to shape the pump radiation coming from diode lasers.

The pump radiation incident in the laser-active crystal is absorbed there by the laser-active ions. After entering the laser-active crystal, the intensity of the incident pump radiation is exponentially reduced in the propagation direction by absorption. A significant proportion (typically from 25 to 50%) is dissipated to the laser-active crystal in the form of heat. This thermal energy leads to local heating of the laser-active crystal. The advantages of laser-active crystals with weak doping are described, for example, in Specification WO 00/31842. When weakly doped laser-active crystals are used, the absorbed pump radiation is distributed over a larger volume.

According to the teaching disclosed in that specification, for example, in Nd:YVO$_4$ the doping should amount to less than 0.5%. The doping concentration of laser-active crystals, however, is currently subject to fluctuations of typically 0.1% due to fabrication. In laser-active crystals with 0.3% doping, for example, these fluctuations lead relatively to significant deviations from the setpoint value of the doping concentration, which may amount to more than 30%. Reliable usability of these laser-active crystals is thereby restricted to a significant extent.

Another method of reducing the thermo-optical problems in solid-state lasers, which are excited by diode lasers using optical fibres, is to use fibre bundles instead of a single multimode optical fibre. In this way, the intensity distribution of the pump light can be shaped. This is described, for example, in Specification EP 0990283 and in Specification WO 96/34436. The thermal gradients due to variation along the absorption direction and the concomitant thermally induced mechanical stresses remain, however.

Beam shaping by optical fibres has—besides the said advantages—substantial disadvantages, however, which generally result in disadvantageous properties for the longitudinally excited solid-state lasers produced using it:
  a) Input losses, which typically amount to between 25 and 40%, occur during input into the optical fibre. Therefore, at most 75% of the diode-laser radiation can be used as pump radiation to excite the solid-state laser.
  b) Manufacture of the diode lasers with optical fibres leads to high costs.
  c) The transport of the radiation in the optical fibre is not polarisation-preserving, that is to say polarised components of the pump radiation from the diode laser are converted into other polarisation states by being transported in the optical fibre. The polarisation direction of the light at the output of the optical fibre is not generally stable as a function of time. For example, the polarisation direction varies when the fibre is mechanically moved.

The partial depolarisation of the pump radiation and the temporal instability of the polarisation state can lead to significant problems in end-pumped solid-state lasers. This is true especially if the absorption coefficients of the laser crystals being used depend on the polarisation direction of the incident pump light, or if the laser contains optical elements or surfaces whose transmission properties are dependent on the polarisation state of the pump light, and on its stability.

The problems due to excitation with unpolarised pump radiation can be divided into two categories.

1. There are known to be laser-active crystals whose absorption is independent of the polarisation (for example neodymium-yttrium aluminium garnet (Nd:YAG)), and ones in which the value of the absorption coefficient for the pump radiation depends on the polarisation of the pump light with respect to the crystalline axes. These laser-active crystals are optically anisotropic in respect of absorption. Examples of laser-active crystals which absorb polarisation-dependently are known to include neodymium-yttrium vanadate (Nd: $YVO_4$) and neodymium-gadolinium vanadate (Nd:$GdVO_4$) as well as neodymium-yttrium lithium fluoride (Nd:YLF), neodymium-lanthanum scandium borate (Nd:LSB) and neodymium-yttrium aluminium perovskite (Nd:$YAlO_3$). These materials have high absorption coefficients for the pump radiation, the value of which differs greatly along the crystal axes. In Nd:$YVO_4$, for example, 809 nm pump radiation with a polarisation parallel to the c-axis of the crystal is absorbed about 4 to 6 times more strongly than pump radiation with a polarisation parallel to the a-axis. Owing to these differences between the absorption coefficients, it is no longer possible to find an optimum doping concentration or crystal length so that partially polarised light is absorbed uniformly in the crystal. This differential absorption of the various polarisation components leads to additional mechanical stress loads in the laser crystal. Furthermore, a change in the polarisation of the pump light causes a change in the absorbed power, as well as its spatial distribution in the laser-active crystal. Laser operation problems are generally caused in this way. The reasons for such problems are, for example, temporal fluctuations in the polarisation direction, which are due for example to mechanical movements of the fibre or the pump-light source.

2. The pump radiation is conventionally injected into the solid-state laser through resonator mirrors and the end faces of the laser-active crystal. These elements are provided with dielectric coatings which have defined reflection properties. They function as highly or semi-reflective mirrors or as antireflection coatings, and they often have polarisation-dependent transmission or reflection properties. Fluctuations in the pump-light polarisation can therefore lead to fluctuations in the transmitted pump power. Furthermore, it is common to use laser-active crystals whose end faces are oriented at the Brewster angle, and which therefore have a polarisation-dependent transmission. Such crystal faces are transmissive with low loss only for a particular polarisation direction.

In order to avoid the said disadvantages, methods have been developed which are intended to reduce or avoid a laser operation problem due to a change in the pump-light polarisation. However, the methods known from the prior art only partially resolve the described problems in end-pumped solid-state lasers. For instance, U.S. Pat. No. 6,137,820 describes a method in which the pump radiation from the diode laser is split into two subsidiary beams after being transported through an optical fibre. The splitting is carried out with a polarizer, so that each subsidiary beam is completely polarised linearly. The polarised subsidiary beams are used for the longitudinal excitation of a solid-state laser. However, the effect of polarisation changes in the optical fibre is to change the power components in the two subsidiary beams when the polarisation components are split at the polarizer. These power fluctuations furthermore lead to spatial differences of the excitation in the laser crystal, and therefore to changes in the laser output power and the beam quality. Another disadvantage is the reduction (halving) of the power of the pump radiation by the beam splitting.

U.S. Pat. No. 5,999,544 describes an arrangement in which the pump radiation for a diode-pumped solid-state laser is deliberately depolarised before or after it is transported through an optical fibre. This avoids fluctuations in the polarisation state of the pump radiation, and therefore minimises their effect on the laser operation. For laser-active crystals with anisotropic absorption, for example Nd:$YVO_4$, one half of the unpolarised pump radiation is absorbed over a short length and the other half is absorbed over a distance several times longer. A significant part of the pump power is absorbed in the immediate vicinity of the end face, where it locally causes strong heating of the laser-active crystal. The fact that the heat is not distributed uniformly in the laser-active crystal causes significant thermo-optical problems. Another disadvantage is that the depolarised pump radiation experiences significant losses when passing through faces with a polarisation-dependent transmission (for example crystals with Brewster end faces).

It is an object of the invention to provide a device for the optical excitation of laser-active crystals with polarisation-dependent absorption, which delivers constant laser radiation as a function of time while efficiently utilising the pump radiation. Laser radiation with a high efficiency and therefore a high output power with a good spatial beam quality is also intended to be facilitated.

The object is achieved by a device which is characterised in that the pump radiation (2) from the diode laser (1) is substantially polarised linearly in a privileged polarisation direction, and in that the polarisation direction of the pump radiation (2) is oriented parallel to the weak-absorption axis (A) of the laser-active crystal (14) when it is incident in the laser-active crystal (14).

It is also an object of the invention to provide a method for the optical excitation of laser-active crystals with polarisation-dependent absorption, which delivers constant laser radiation as a function of time while efficiently utilising the pump radiation. Laser radiation with a high efficiency and therefore a high output power with a good spatial beam quality is also intended to be facilitated.

The object is achieved by a method which is characterised by the following steps:

shaping pump radiation generated by the diode laser, the shaped pump radiation having a polarisation direction, and projection onto a laser-active crystal, which has an axis with strong absorption and an axis with weak absorption, so that the polarisation direction of the pump radiation is oriented parallel to the weak-absorption axis of the laser-active crystal.

One advantage of the invention is that the absorbed power is thereby distributed over a substantially larger volume in the laser-active crystal. Thermally induced effects in the laser-active crystal are therefore substantially reduced. The power absorbed in the laser-active crystal is distributed over a substantially larger crystal volume than if the polarisation of the pump radiation were to be oriented so that the laser-active crystal absorbs strongly. This significantly reduces disadvantageous modifications of laser properties due to local heating of the laser-active crystal.

Another advantage is that laser radiation can thereby be produced with a high efficiency and therefore a high output power with a good spatial beam quality. The radiation generated by this method is preferably diffraction-limited and should have a high brilliance. The power of the laser radiation is furthermore maximally stable as a function of time, and insensitive to external effects. With the invention, the pump power of diode-pumped solid-state lasers is increased by several times compared with existing systems, before thermally induced problems occur in the laser-active crystal. In this way, either the output power of the solid-state laser can be multiplied or, with the same output power, the beam quality and brilliance of the solid-state laser radiation can be improved significantly.

The invention also affords the advantage that laser-active crystals with commercially available doping can be used in solid-state lasers with a high output power. These crystals which, for example, contain more than 0.5% (at.) neodymium, on the one hand offer the advantage that the fluctuations in the doping concentration due to production are less serious than in crystals with weaker doping. On the other hand, more laser energy can be stored per volume element in crystals with heavier doping. This is, for example, particularly advantageous for lasers which emit radiation in the form of light pulses. In general, the greater amount of stored energy makes it possible to generate more energetic light pulses.

For the excitation of solid-state lasers, diode lasers which are arranged in the form of diode-laser bars (linearly or as a two-dimensional matrix), with beam shaping by optical fibres, offer the advantage that high pump powers (of up to 30 W) can be focused onto spots with a small diameter (typically from 0.4 to 1 mm). The focused pump radiation has a circular cross section. Good overlap of the pumped volume of the laser-active crystal with the modes of the resonator of the solid-state laser can be achieved in this way. Owing to the use of optical fibres, the pump sources for diode lasers (including the power supply and cooling) can furthermore be spatially separated from the laser resonator, so that more compact and more stable laser structures can be produced.

The pump radiation incident in the laser-active crystal is absorbed there by the laser-active ions. After entering the laser-active crystal, the intensity of the incident pump radiation is exponentially reduced in the propagation direction by absorption. The extent of this reduction, which is described by the absorption coefficients, depends on the spatial density of the laser-active ions (doping) and on their absorption cross section. Maximally high absorption is normally utilised for efficient excitation. Energy is stored in the laser-active ions during absorption, but only part of it is converted into laser light. A significant proportion (typically from 25 to 50%) is dissipated to the laser-active crystal in the form of heat. This thermal energy leads to local heating of the laser-active crystal. Since many of the laser-active crystals which are used have a comparatively poor thermal conductivity, significant temperature differences occur between the regions pumped to differing degrees in the laser-active crystal. The temperature differences lead to thermo-optical effects. For example, the crystal end faces curve owing to the thermal expansion of the crystal centre. The curved end faces act as a thick lens. The thermal expansion furthermore generates mechanical stresses, which change the refractive index. The temperature profile which is formed inside the crystal results in a refractive-index profile, which likewise acts as a lens. The sum of these effects, which are usually combined under the term "thermally induced lens", leads to deformation of the emitted laser beam and usually deterioration of its spatial beam quality. The thermally induced mechanical stresses may even cause the crystals to fracture. The invention has the advantage of avoiding the aforementioned disadvantages of the prior art.

Whereas the output power of diode-pumped solid-state lasers has been restricted in the past by the available pump power of the diode lasers, diode lasers are nowadays so powerful that a restriction is placed on the output power by the thermal loading limit of the laser-active crystals. With the invention, for the first time, this restriction does not occur until substantially higher pump powers, so that it is possible to produce more powerful lasers with a good beam quality. The use of polarised pump radiation furthermore offers, for the first time, the opportunity to use optical components and resonator configurations for the solid-state laser which could not previously be employed with partly or unpolarised pump radiation from diode lasers, or could only be used inefficiently.

Crystals which consist of $Nd:YVO_4$, $Nd:GdVO_4$, Nd:LSB, $Nd:YAlO_3$, Nd:YLF or Nd:BEL have proved expedient as laser-active crystals. Other crystals with anisotropic absorption may likewise be used.

It is important for the light from the diode laser to be imaged optimally into the laser-active crystal. To that end, an optical element which is configured in the form of micro-optics, for example, is arranged downstream of the diode laser in order to achieve appropriate spatial shaping of the pump radiation from the diode laser. It is particularly advantageous for the optical element to be designed in the form of a waveguide, in order to achieve spatial shaping of the pump radiation from the diode laser. The polarisation-dependent waveguide may, for example, consist of a glass rod or an optical fibre.

In order to improve the output power of the solid-state laser in which the laser-active crystal is located, it is possible to provide a plurality of diode lasers which project the light of the pump radiation leaving them onto the laser-active crystal. At least one resonator mirror, for example, may be provided in order to project the pump radiation onto the laser-active crystal. It is likewise conceivable for the pump radiation, shaped suitably for the injection, to be injected directly into the laser-active crystal.

Another preferred embodiment of the invention is, that the second end face of the laser-active crystal is assigned a reflector, which reflects the unabsorbed pump radiation that was injected through the first end face, and injects it into the second end face as reflected pump radiation.

The laser-active crystal used here is selected such that it has doping and a length so that approximately 50 to 60% of the pump radiation can be absorbed in the laser-active crystal after entering through the first end face.

In another preferred embodiment of the invention, a laser oscillator which generates an output beam is provided. An input mirror for the output beam is provided between imaging optics for the pump beam and the first end face of the laser-active crystal. The output beam passes through the laser-active crystal at least once, while generating a beam with higher output power.

Further advantageous refinements of the invention can be found in the dependent claims.

The subject-matter of the invention is schematically represented in the drawing and will be described below with reference to the figures, in which.

Figure 1:
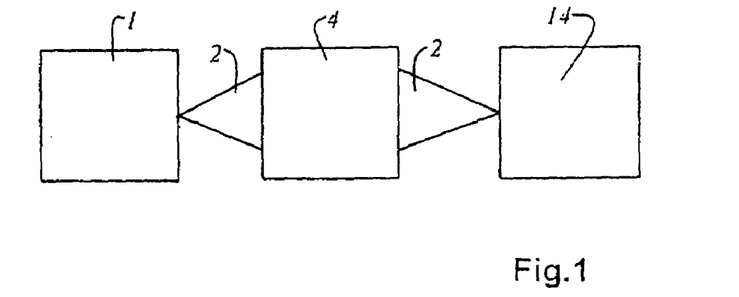
FIG. 1 shows a schematic representation of the principle of the arrangement according to the invention.

The principle of the arrangement according to the invention is represented in FIG. 1. This arrangement contains a diode laser 1, which emits linearly polarised light. The laser light is referred to as pump radiation 2. The pump radiation 2 has its spatial distribution shaped spatially by an optical element 4, and is injected into a laser-active crystal 14 which has a polarisation-dependent absorption. The fundamental features of the arrangement according to the invention including the use of linearly polarised pump radiation 2, which is generated by a diode laser 1. The linearly polarised pump radiation 2 is used for exciting (pumping) the laser-active crystal 14. The laser-active crystal 14 has a polarisation-dependent absorption, that is to say the pump radiation 2 is absorbed particularly well in a preferential crystal direction. The linear polarisation state of the pump radiation 2 should therefore be preserved as far as possible when the spatial distribution of the pump radiation 2 is being shaped by the optical element 4. The spatial distribution shaped by the optical element 4 is, for example, suitable for longitudinal excitation of the solid-state laser crystal. According to the invention, this laser-active crystal 6 is oriented with respect to the direction of the linearly polarised pump radiation so that the polarisation is parallel to the direction of the weaker absorption of the laser-active crystal 14.

Figure 2:
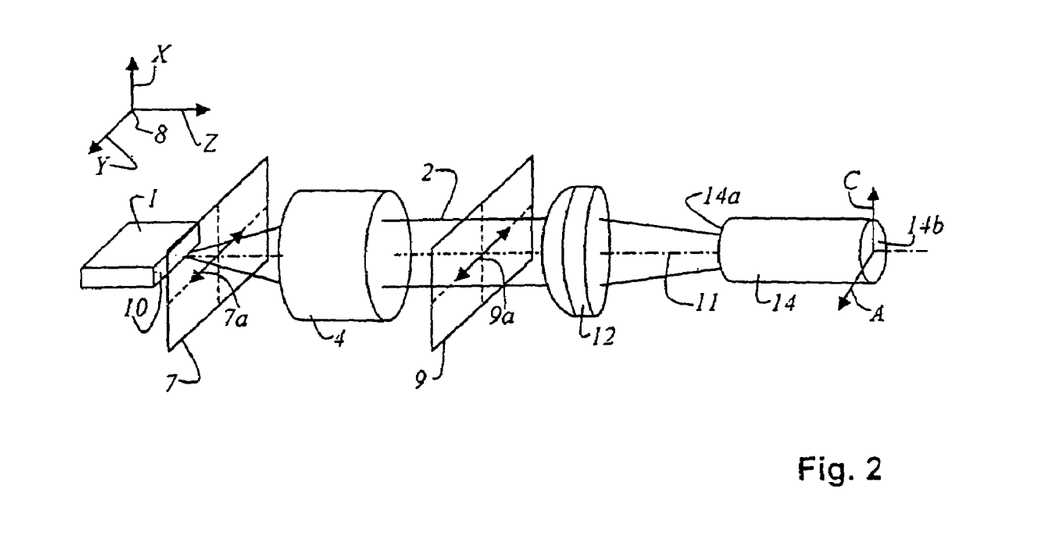
FIG. 2 shows a schematic representation of an arrangement for shaping the pump radiation of a diode laser and projecting it onto a laser-active crystal.

FIG. 2 shows a schematic representation of an arrangement for shaping the pump radiation 2 from the diode laser 1. A preferred diode laser 1 consists of a multiplicity of individual emitters. The individual emitters may be arranged in the form of a linear array. The arrangement may likewise be configured in the form of a 2-dimensional array. A coordinate system 8, with an x-direction X, a y-direction Y and a z-direction Z, is also added to the representation in FIG. 1 in order to illustrate the spatial positioning of the arrangement and the optical directions. In the exemplary embodiment represented here, the diode laser 1 has an exit facet 10 which is arranged parallel to the y-direction Y. The polarised pump radiation 2, which has a strip-like emission characteristic, is emitted in the z-direction Z from the exit facet 10 by the diode laser 1. In a first x-y section plane 7 immediately behind the diode laser 1, the intensity distribution of this pump radiation 2 has a dimension of typically 10 mm in the y-direction Y and a few µm in the x-direction X. The beam profile of the pump radiation 2 is Gaussian and strongly divergent in the x-direction X ("fast axis"), and highly structured (diffraction factor $M^2 > 1000$) in the y-direction Y ("slow axis"). The pump radiation 2 is polarised with a polarisation ratio of about 100:1, typically in the y-direction Y. The polarisation direction of the pump radiation 2 is labelled by a double arrow 7a in the first x-y section plane 7. The beam shaping is carried out so that the polarised pump radiation 2 from the diode laser 1 is shaped by at least one optical element 4, while preserving the polarisation properties (linearly polarised), into a spatial intensity distribution which can be imaged longitudinally onto the transverse fundamental mode of a solid-state laser or laser amplifier. The pump radiation 2, or the pump light, has an approximately circular, rectangular or elliptical intensity distribution in the a second x-y section plane 9 behind the optical element 4. The pump radiation 2 is furthermore linearly polarised, for example in the y-direction (as labelled by the double arrow 9a in the second x-y section plane 9), and the polarisation ratio is preferably more than 10:1. In the exemplary embodiment represented in FIG. 2, the polarisation directions in the first x-y section plane 7 and the second x-y section plane 9 are represented as being parallel. In the general case, the polarisation direction in the second x-y section plane 9 may also be rotated with respect to the first x-y section plane 7. What is important for the invention is that the pump radiation 2 is linearly polarised and parallel to the weak-absorption axis A when it strikes the laser-active crystal 14. For the optical shaping of the laser radiation, the optical element 4 may also be used in the form of polarisation-preserving micro-optics, waveguides or polarisation-preserving optical fibres. The spatially shaped pump radiation 2 is imaged onto a laser-active crystal 14 by imaging optics 12. FIG. 2 represents a case in which the polarisation direction is parallel to the weak-absorption axis A. In cases when this is not so, the laser-active crystal 14 may be oriented suitably so as to satisfy parallelism of the weak-absorption axis A and the polarisation direction. An optical means (not shown) may also be provided, for example a phase plate or double reflection, which rotates the polarisation direction suitably so as to satisfy the requisite parallelism. The laser-active crystal 14 has a first end face 14a and a second end face 14b. The pump radiation 2 is injected into the laser-active crystal 14 injected from at least one end face 14a or 14b. The imaging optics 12 may be a lens or a lens system. Reflective optics with imaging properties are also possible, for example reflection and focusing of the pump radiation 2 by suitable mirrors. The absorption by the laser-active crystal 14 is polarisation-dependent. The features resulting from this will be clarified below with reference to the example of Nd:YVO$_4$. The diode laser 1, the optical element 4, the imaging optics 12 and the laser-active crystal 14 are arranged on a common beam axis 11, which is represented by dots and dashes in FIG. 2. The laser-active crystal 14 is represented as being cylindrical with a circular cross section in FIG. 2. Other cross sections, for example rectangular, square or polygonal, are nevertheless conceivable as well.

In a Nd:YVO$_4$ crystal which is used in the embodiment represented, there is an optically privileged direction, which is perpendicular to the beam axis 11 in the orientation described here. This privileged direction is referred to as a crystalline c-axis c. The directions perpendicular to it are both referred to as crystalline a-axes a. For pump radiation 2 with a wavelength of 808.6 nm, the maximum absorption coefficient for the pump radiation 2 which is polarised parallel to the crystalline c-axis c is $\alpha_c$=40.7 cm$^{-1}$. It is therefore about four times as great as the absorption coefficient $\alpha_a$=10.5 cm$^{-1}$ for radiation which is polarised perpendicularly thereto, that is to say in the direction of the crystalline a-axis a. In the invention, the polarisation direction of the pump radiation 2 is oriented in the direction of the weak absorption of the laser-active crystal 14. In the example shown in FIG. 2, the orientation is in the y-direction Y of the coordinate system and therefore parallel to the crystalline a-axis a of the laser-active crystal 14.

The use of a material like Nd:YVO$_4$ as the material for the laser-active crystal 14 is particularly advantageous since this material is capable of efficiently absorbing the pump radiation 2 having a defined polarisation in the direction of the crystalline a-axis a (weak-absorption axis) with a comparatively low absorption coefficient, and of emitting laser radiation having polarisation perpendicular to it, that is to say parallel to the crystalline c-axis c (strong-absorption axis). The particular advantage of emission with polarisation parallel to the crystalline c-axis c is that this radiation has a high cross section for stimulated emission, that is the say it experiences strong laser amplification.

Figure 3:
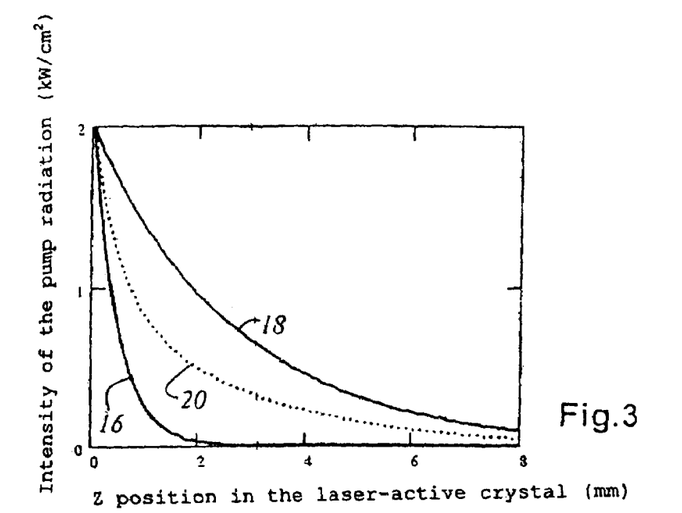
FIG. 3 shows a diagram, which shows the intensity of the light of the pump radiation as a function of the position in the laser-active crystal.

The reduction in the thermal load on the laser-active crystal 14, which results from the arrangement according to the invention, will be substantiated below with reference to the example of a typical Nd:YVO$_4$ crystal. The laser-active crystal 14 has a diameter of 4 mm, a length of 8 mm and neodymium doping of 1% (at.). The pump radiation 2 has a power of 10 watts and is injected into the laser-active crystal 14 from the first end face 14a through a circular area with a diameter of 0.8 mm. For the actually effective absorption of this pump radiation 2, the widths of the spectral distributions of pump light and the absorption lines must be taken into account. The so-called "effective" absorption coefficients are calculated from the convolution integral of the two distributions and, for example, for a typical diode laser 1 with a spectral width of 3 nm and a central wavelength of 808.6 nm they are $\alpha_c$(eff.)=21.3 cm$^{-1}$ and $\alpha_a$(eff.)=3.8 cm$^{-1}$. The effective absorption is thus about six times stronger for pump radiation 2 which is polarised in the direction of the crystalline c-axis c, than for pump radiation 2 with polarisation in the direction of the crystalline a-axis a. FIG. 3 represents the local power density (intensity) of the pump radiation 2 in the laser-active crystal 14 along the z-direction Z. On the first end face 14a of the laser-active crystal 14 (z=0), it is 2 kW/cm$^2$. After entering the laser active crystal 14, the intensity of the incident pump radiation 2 decreases exponentially owing to the absorption. A first curve 16 shows the absorption for the pump radiation 2 which is polarised parallel to the crystalline c-axis c. Even after only 0.47 mm, the intensity has dropped to 36% (1/e). In comparison, a second curve 18 shows the absorption for the pump radiation 2 which is polarised perpendicularly to the crystalline c-axis c, that is to say in the direction of the weak-absorption axis A. The intensity has not dropped to 36% (1/e) until after 2.7 mm, that is to say after a distance about six times longer. Over the 8 mm length of the laser-active crystal 14, 95% of the light of the pump radiation 2 is absorbed. The absorption for unpolarised pump radiation 2 is represented by the dotted third curve 20. The sharp drop in the vicinity of the first end face 14a of the laser-active crystal 14 can be seen clearly, showing that more than half of the power is absorbed over a distance of less than 1 mm.

Figure 4A:
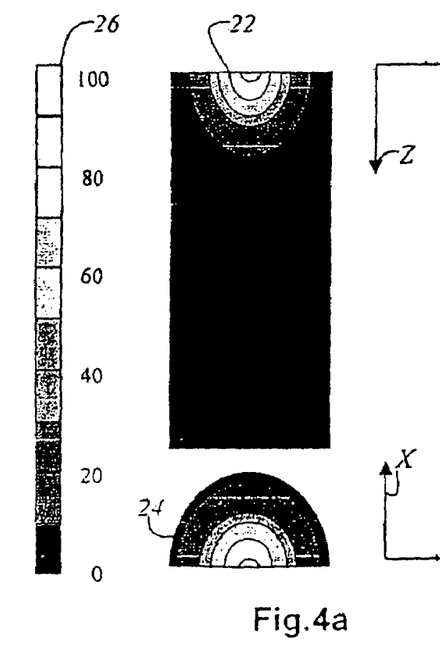
FIG. 4a shows a representation of the temperature distribution in the laser-active crystal, the pump radiation being polarised in the c-direction of the laser-active crystal.
Figure 4B:
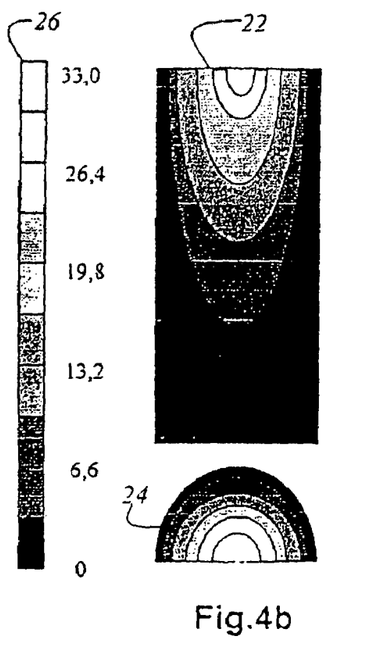
FIG. 4b shows a representation of the temperature distribution in the laser-active crystal, the pump radiation being polarised in the a-direction of the laser-active crystal.

FIG. 4a and FIG. 4b represent the temperature increases and distributions in the Nd:YVO$_4$ crystal, which are caused by the absorption of the pump radiation 2. The temperature distributions were calculated using a suitable simulation model. In order to illustrate the temperatures inside the laser-active crystal 14, a section on an x-z plane through the cylindrical laser-active crystal 14 is represented in an upper image part 22, and the temperature distribution on the first end face 14a of the laser-active crystal 14 can be seen in a lower image part 24. A temperature scale 26 is respectively represented next to the upper and lower image parts 22 and 24. FIG. 4a represents the temperature increase due to the absorption of the pump radiation 2 with a power of 10 W, which is polarised in the c-direction C. The maximum temperature increase is 99° C., and is located directly on the first end face 14a of the laser-active crystal 14. This causes stresses of about 40 MPa on the lateral surface of the laser-active crystal 14. This value is already close to the fracture limit, which is about 50 MPa for Nd:YVO$_4$. The results of the calculation are in good agreement with experiments, in which a crystal with the parameters described here usually broke at a pump power of about 13 watts. The same case is plotted in FIG. 4b for the pump radiation 2 polarised in the a-axis A. The maximum temperature increase is only 33° C., and the heat is distributed over a much larger volume. The thermally induced stresses are at most 15 MPa. For the laser crystal 6 described in this example, the pump power is thus increased by three times with the invention compared to previously conventional systems. A substantially higher output power of the solid-state laser can therefore be achieved.

Figure 5:
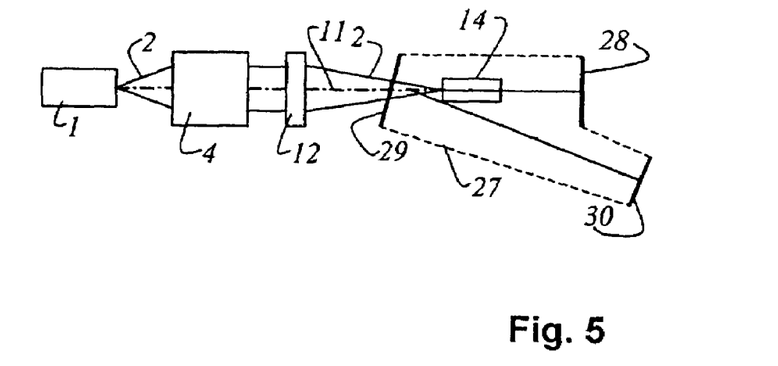
FIG. 5 shows a schematic representation of a laser which generates the laser radiation in the laser-active crystal of the pump radiation from the diode laser.

In order to produce a laser, the laser-active crystal 14 is located as represented in FIG. 5 in a laser resonator 27, which is typically formed by a multiplicity of mirrors 28, 29, 30 or reflective faces. In this exemplary embodiment, the mirrors 28, 29, 30 are an end mirror 28, optional folding mirror 29 and an output mirror 30. One or more of these reflective coatings may also be located directly on the surface of the laser-active crystal 14. The modes of the laser resonator 27 determine the spatial properties of the laser beam which is produced. The transverse fundamental mode of the laser resonator 27 with a Gaussian intensity distribution is preferred. The pump radiation 2 is preferably injected into the laser-active crystal 14 through one or more of the resonator mirrors (28, 29, 30). The injection takes place along the beam axis 11 (here the z-direction) or at a small angle to it.

Figure 6:
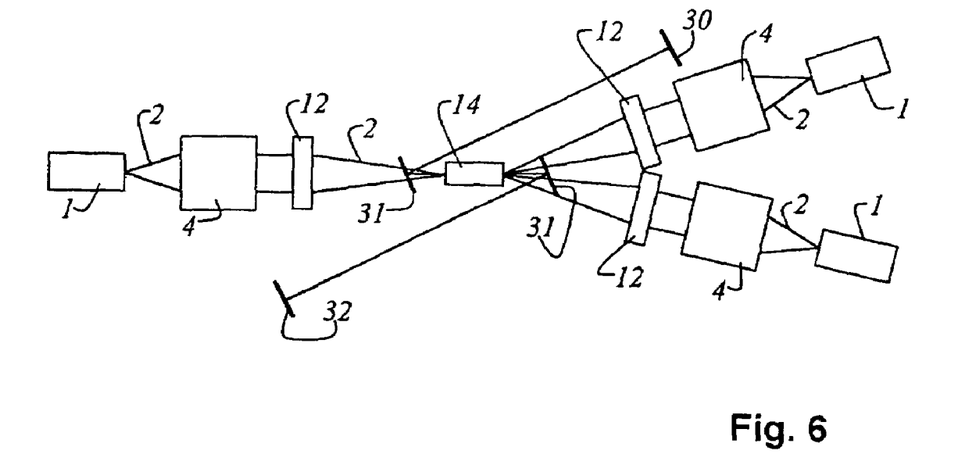
FIG. 6 shows an embodiment of the invention in which the pump radiation from a plurality of diode lasers is injected into the laser-active crystal.

In order to obtain higher output powers from the laser-active crystal 14, pump radiation 2 may be simultaneously injected into the laser-active crystal 14 through its first and second end faces 14a and 14b (see FIG. 6). A plurality of diode lasers 1 are provided, which project the light of the pump radiation 2 leaving them onto the laser-active crystal 14. As already described in FIG. 2, each diode laser 1 is assigned an optical element 4 in order to shape the pump radiation 2. Each optical element 4 is likewise assigned imaging optics 12, which image the pump radiation 2 onto the laser-active crystal 14. At least one resonator mirror 30, 31 and 32 is provided for projecting the pump radiation 2 onto the laser-active crystal 14. The light of the pump radiation 2 from a plurality of diode lasers 1 may furthermore be injected simultaneously from at least one side of the crystal.

Figure 7:
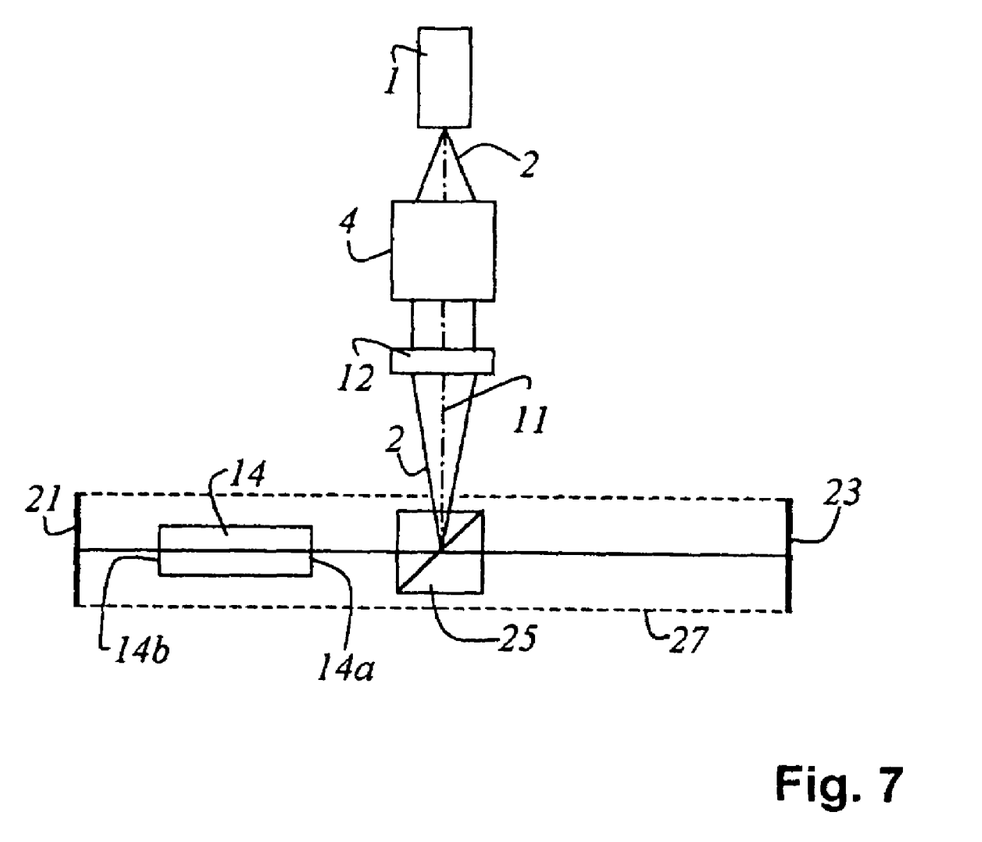
FIG. 7 shows a schematic representation of an embodiment of the invention in which the pump radiation from a diode laser is injected directly into a resonator provided with the laser-active crystal.

FIG. 7 discloses a further exemplary embodiment of the invention. In order to produce a laser, the laser-active crystal 14 is likewise located as represented in FIG. 5 in a laser resonator 27, which is formed here by a first resonator mirror 21 and a second resonator mirror 23. The modes of the laser resonator 27 determine the spatial properties of the laser beam which is produced. The transverse fundamental mode of the laser resonator 27 with a Gaussian intensity distribution is preferred. The pump radiation 2 is injected directly into the laser resonator 27 in this exemplary embodiment. To that end, an appropriate input means 25 is provided, which projects the pump radiation onto the first end face 14a of the laser-active crystal 14. As already described in FIG. 2, each diode laser 1 is assigned an optical element 4 in order to shape the pump radiation 2. Each optical element 4 is likewise assigned imaging optics 12, which image the pump radiation 2 onto the input element 25. The input element 25 is, for example, designed in the form of a polarisation beam splitter. Other forms of the input element 25 are familiar to the person skilled in the art.

Figure 8A:
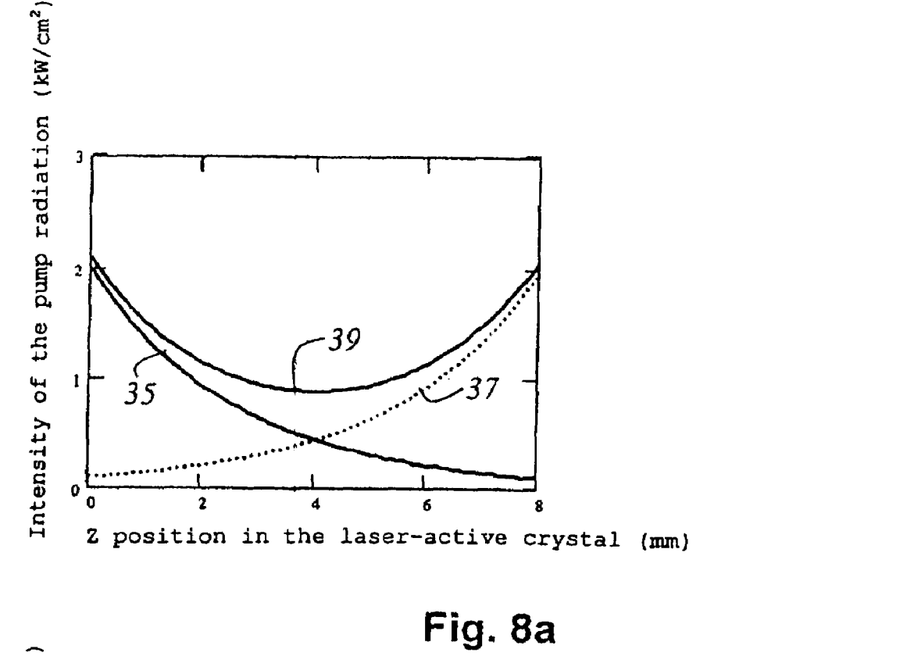
FIG. 8a shows a diagram, which shows the intensity of the pump radiation in the laser-active crystal with excitation through the first and second end faces and polarisation in the direction of the a-axis.
Figure 8B:
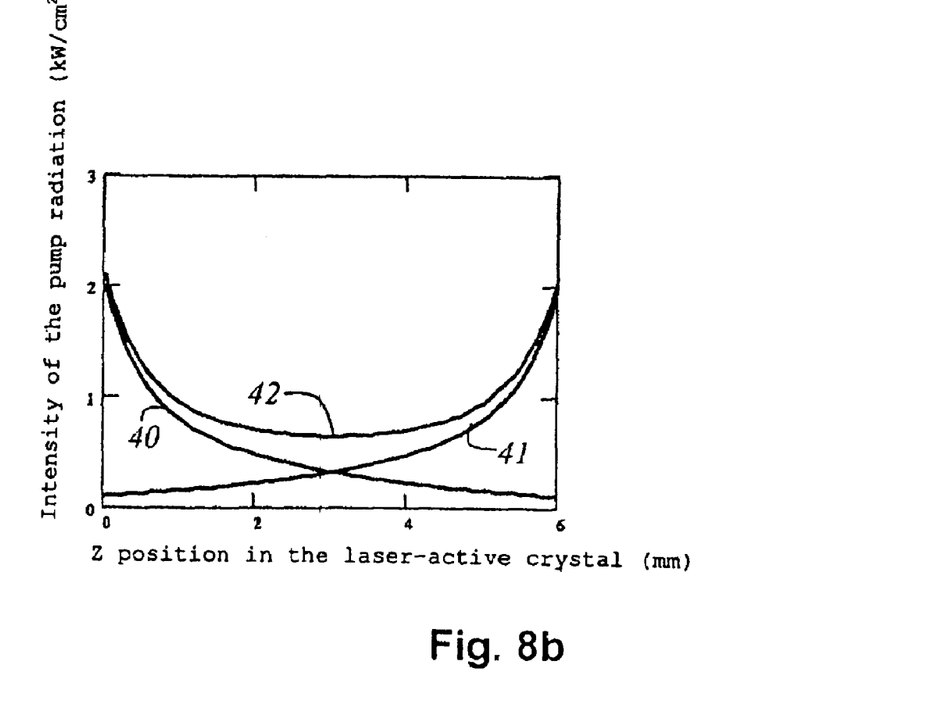
FIG. 8b shows a diagram, which shows the intensity of the pump radiation in the laser-active crystal with excitation through the first and second end faces using unpolarised light.
Figure 9:
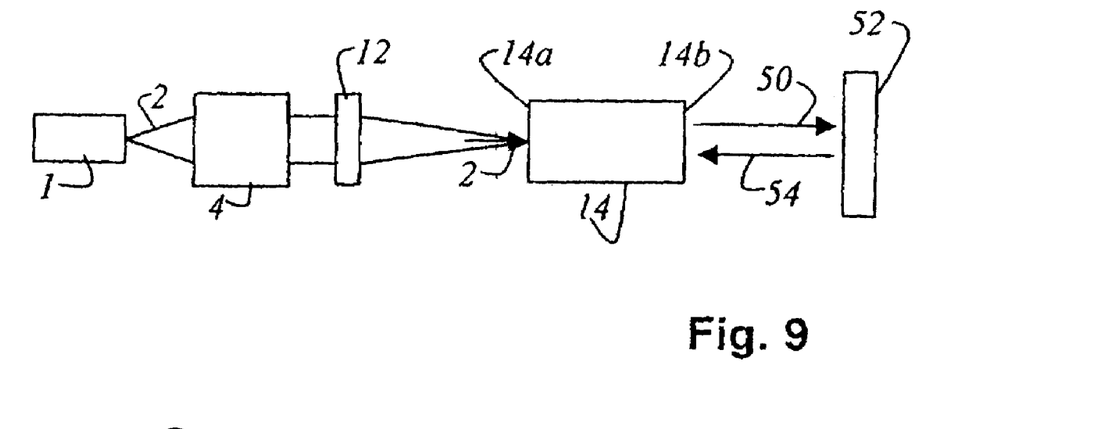
FIG. 9 shows a schematic representation of an embodiment of the invention for reducing the local temperature differences with back-reflection of pump light.

The sharp decrease of the incident pump radiation 2, and the concomitant nonuniform distribution of the heat, can only be compensated for conditionally by the excitation through both end faces 14a or 14b. By analogy with FIG. 3, FIGS. 8a and 8b represent the intensity of the incident pump light in the laser crystal along the z-direction Z, but for excitation through the first and second end faces 14a and 14b. By analogy with FIG. 3, a first curve 35 in FIG. 8a shows the absorption for pump radiation 2 which is polarised in the direction of the weak-absorption axis A and is injected through the first end face 14a. A second curve 37 represents the corresponding intensity profile for the pump radiation 2 which is injected through the second end face 14b. The intensities are added to form a third curve 39, which represents the total intensity. The total intensity does not have a gradient in the middle of the laser-active crystal 14. The decrease of the intensity in the vicinity of the first and second end faces 14a and 14b of the laser-active crystal 14, and the local temperature differences resulting therefrom, are modified less. Even in this case, the arrangement according to the invention leads to a substantial reduction of the thermally induced effects. As a comparison with this, excitation with unpolarised pump radiation 2 is represented in FIG. 8b. In FIG. 8b, a first curve 40 shows the absorption of the unpolarised pump radiation 2, which is injected through the first end face 14a. Correspondingly, a second curve 41 represents the intensity profile for the pump radiation 2 which is injected through the second end face 14b. The intensities are added to form a third curve 42, which represents the total intensity. The sharp reduction of the total intensity in the vicinity of the first and second end faces 14a and 14b is particularly noticeable in FIG. 7b. As already mentioned in FIG. 3, greatly differing temperature distributions are generated in the laser-active crystal by the sharp reduction, and the thermally induced problems therefore remain unchanged. Another method of reducing the local temperature differences in a laser-active crystal 14 with polarisation-dependent absorption by the arrangement according to the invention is to use the unabsorbed pump radiation, which is represented in FIG. 9. In this method with back-reflection of the pump light, the polarised pump radiation 2 from the diode laser 1 is shaped in the optical element 4 and the imaging optics 12, as described, and is injected into the laser-active crystal 14. The doping and the length of the laser-active crystal 14 are selected so that only a part of the pump radiation 2, typically about 40 to 60%, is absorbed in the laser-active crystal 14. Unabsorbed pump radiation 50 is returned into the laser-active crystal 14 by a reflector 52. The reflector 52 generates reflected pump radiation 54, which has a divergence suitable for excitation of the laser. This reflector 52 may also contain imaging optical elements, and it may be applied directly onto the second end face 14b of the laser-active crystal 14. The reflected pump radiation 54 only passes through the laser-active crystal 14 in the opposite direction to the pump radiation 2 injected through the first end face 14a, and is further absorbed during this. A more uniform distribution of the intensity of the pump radiation 2 in the laser-active crystal 14 is achieved in this way. It is furthermore possible to use shorter laser crystals, which is advantageous for the generation of ultra-short laser pulses.

Figure 10:
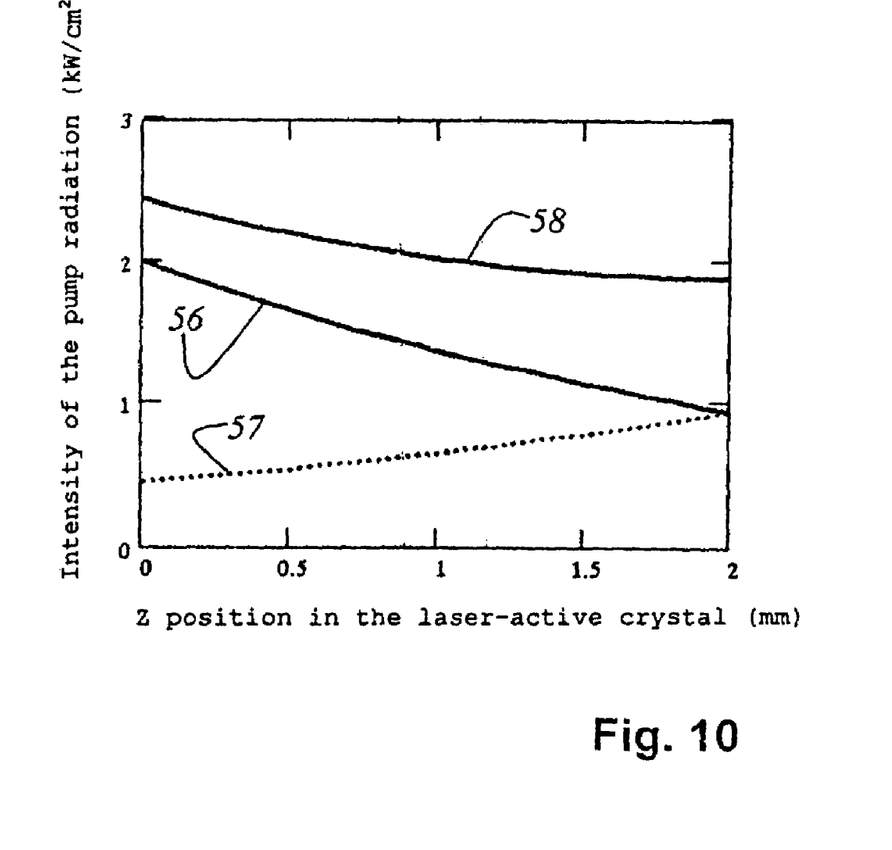
FIG. 10 shows a graphical representation of the power density of the injected pump radiation for the case with back-reflection of pump light.

FIG. 10 represents the power density of the incident pump radiation 2 in the laser-active crystal 14 for the case of the pump-light back-reflection described in FIG. 9. The laser-active Nd:YVO$_4$ crystal has a length of 2 mm in this example. On the first end face 14a of the laser-active crystal 14 (z=0), the pump power density is 2 kW/cm$^2$. When passing through the laser crystal, the intensity of the incident pump light decreases to about 1 kW/cm$^2$ owing to the absorption, as shown in a first curve 56. The unabsorbed pump radiation 50 is reflected back, and further absorbed on the return leg through the laser-active crystal 14, as represented in a second curve 57. The total intensity is represented in a third curve 58, and shows a very minor reduction in the intensity along the incidence direction. In this way, the aforementioned thermally induced problems in the laser-active crystal 14 are further reduced or substantially avoided.

Figure 11:
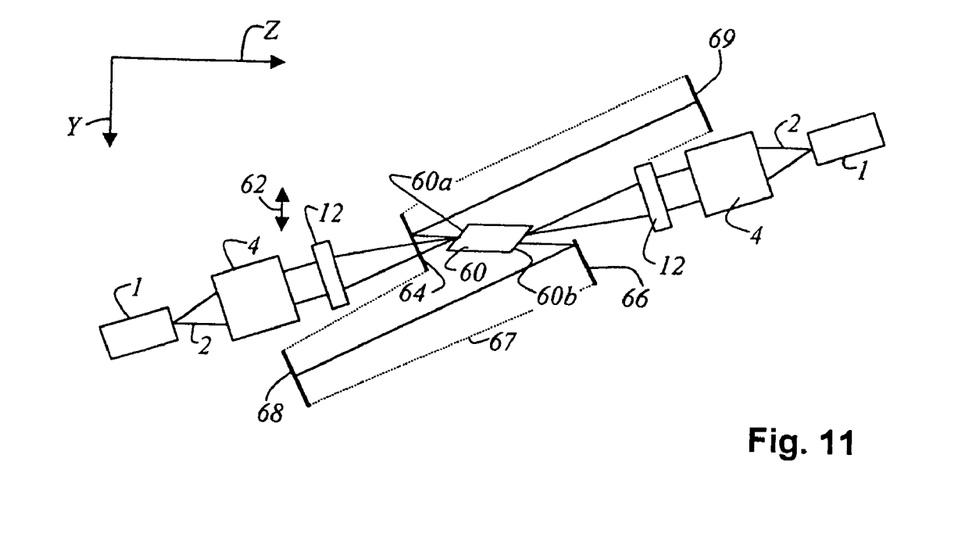
FIG. 11 shows a pump arrangement for solid-state laser crystals with a plurality of end faces, which are arranged at the Brewster angle.

FIG. 11 shows the pump arrangement for solid-state laser crystals 60 with one or more end faces 60a, 60b which are arranged at the Brewster angle. The polarisation direction (here the y-direction Y) of the pump radiation 2, that is to say the direction of the E-field vector 62 represented by the double arrow, in this case lies in the plane of the Brewster section. The pump radiation 2 is generated by at least one diode laser 1. As represented in FIG. 5, FIG. 6 or FIG. 9, the optical element 4 and the imaging optics 12 are arranged downstream of the diode laser 1. The pump radiation 2 is injected through a first folding mirror 64 or past a second folding mirror 66. In the event that the polarisation of the pump radiation 2 and the laser light are oriented perpendicular to each other, the pump radiation 2 may also be injected into the solid-state laser crystal 60 via an optical element with polarisation-dependent transmission and reflection (for example a polarizer) internal to the resonator. The solid-state laser crystal 60 is likewise located in a resonator 67, which is bounded by a first resonator mirror 68 and a second resonator mirror 69. Such an arrangement can offer significant advantages. On the one hand, it is possible to produce a geometrical resonator configuration in which the solid-state laser crystal 60 does not need to be placed in the vicinity of a resonator mirror 68 or 69. On the other hand, it is possible to produce laser systems in which injection of the pump radiation 2 through the folding mirrors 64 or 66 would be difficult or disadvantageous. For example, this is the case with UV light excitation for which the mirrors have a low damage threshold, or in the event that the pump radiation 2 and the laser light have a similar wavelength.

Figure 12:
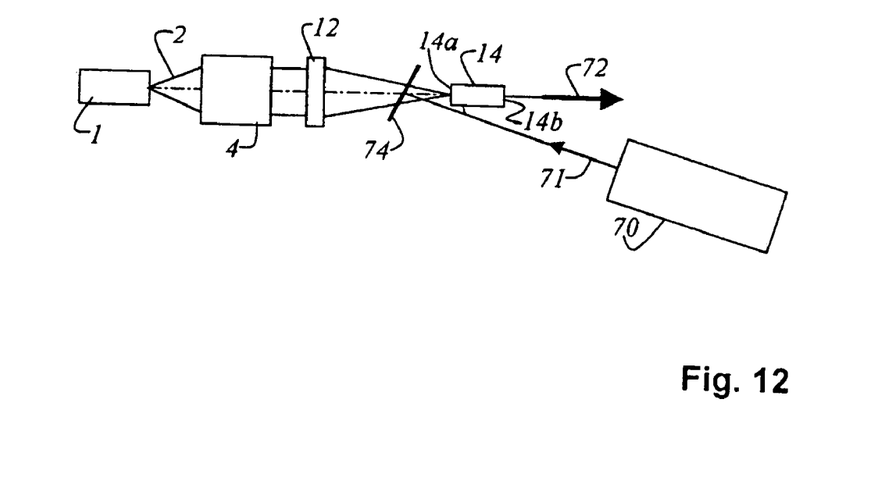
FIG. 12 shows a schematic representation of a laser amplifier with the features according to the invention, which is pumped by a diode laser.

FIG. 12 shows the arrangement with the features according to the invention for a laser amplifier, which consists of a diode laser 1 as the pump-light source, an optical element 4, imaging optics 12 and a laser-active crystal 14. The pump radiation 2 absorbed in the laser-active crystal 14 leads to energy storage there. A laser oscillator 70 generates an output beam 71, the beam profile of which preferably corresponds to the transverse fundamental mode.

The power of the laser oscillator 70 may be output continuously or in a pulsed form. An input mirror 74 is provided in order to inject the output beam 71 of the laser oscillator 70 into the laser-active crystal 14. The output beam 71 of the laser oscillator 70 passes through the laser-active crystal 14 one or more times. The energy stored in the laser-active crystal 14 amplifies the output beam 71 to form a beam with higher output power 72. Care should be taken that the spatial shape of the pump radiation is matched to the profile of the output beam 71 of the laser oscillator 70. The orientation of the linearly polarised pump radiation 2 from the diode laser 1 parallel to the direction of the weaker absorption (a-axis A) of the laser-active crystal 14, according to the invention, achieves distribution of the power absorbed in the laser-active crystal 14 over a substantially larger crystal volume. As described with reference to FIG. 1, less thermally induced problems are thereby caused in the laser crystal. In this way, the beam profile of the amplified beam is substantially not modified and a high spatial quality of the beam from the laser oscillator 70 is maintained even during the amplification.

The input mirror 74 may also be omitted in the present exemplary embodiment. The output beam 71 of the laser oscillator 70 will then be injected into the laser-active crystal 14 directly via the first or second end face 14a or 14b.

The invention has been described with reference to a particular embodiment. It is of course clear that changes and modifications may be made, without thereby departing from the scope of protection of the claims which follow.

LIST OF REFERENCES 1 diode laser
2 pump radiation
4 optical element
7 first x-y section plane
7a double arrow
8 coordinate system
9 second x-y section plane
9a double arrow
10 exit facet
11 beam axis
12 imaging optics
14 laser-active crystal
14a first end face
14b second end face
16 first curve
18 second curve
20 third curve
21 first resonator mirror
22 upper image part
23 second resonator mirror
24 lower image part
25 input means
26 temperature scale
27 laser resonator
28 end mirror
29 folding mirror
30 output mirror
31 resonator mirror
32 resonator mirror
33 resonator mirror
35 first curve
37 second curve
39 third curve
40 first curve
41 second curve
42 third curve
50 unabsorbed pump radiation
52 reflector
54 reflected pump radiation
56 first curve
57 second curve
58 third curve
60 solid-state laser crystal
60a end face
60b end face
62 E-field vector
64 first folding mirror
66 second folding mirror
67 resonator
68 first resonator mirror
69 second resonator mirror
70 laser oscillator
71 output beam
72 amplified output beam
74 input mirror
A axis with weak absorption
C axis with strong absorption
a crystalline a-axis
c crystalline c-axis
X x-direction
Y y-direction
Z z-direction

The invention claimed is:

1. Device for the optical excitation of laser-active crystals, with a diode laser (1) which generates pump radiation (2), the laser-active crystal being arranged in a solid-state laser or solid-state laser amplifier and the laser-active crystal having an axis (C) with strong absorption and an axis (A) with weak absorption, comprising: an optical element (4) is arranged downstream of the diode laser (1) in order to achieve spatial shaping of the pump radiation from the diode laser (1) and in that the pump radiation (2) from the diode laser (1) is substantially polarised linearly in a privileged polarisation direction, and in that the polarisation direction of the pump radiation (2) is oriented parallel to the weak-absorption axis (A) of the laser-active crystal (14) when it is incident in the laser-active crystal (14); and wherein the laser-active crystal (14) has at least a first and a second end face (14a, 14b) which have a polarisation-dependent transmission, and in that the polarisation direction of the pump radiation (2) is oriented so that the reflection losses at the first or second end faces (14a, 14b) are minimal and the optical power which enters the laser-active crystal (14) is maximal.

2. Device for the optical excitation of laser-active crystals, with a diode laser (1) which generates pump radiation (2), the laser-active crystal being arranged in a solid-state laser or solid-state laser amplifier and the laser-active crystal having an axis (C) with strong absorption and an axis (A) with weak absorption, comprising: an optical element (4) is arranged downstream of the diode laser (1) in order to achieve spatial shaping of the pump radiation from the diode laser (1) and in that the pump radiation (2) from the diode laser (1) is substantially polarised linearly in a privileged polarisation direction, and in that the polarisation direction of the pump radiation (2) is oriented parallel to the weak-absorption axis (A) of the laser-active crystal (14) when it is incident in the laser-active crystal (14); and wherein the solid-state laser or solid-state laser amplifier comprises a laser resonator (27) with a multiplicity of mirrors (28, 29, 30), the surfaces of which are provided with polarisation-dependent transmission, and in that the polarisation direction of the pump radiation (2) is oriented so that the reflection losses at these surfaces are minimal and the optical power which enters the laser-active crystal (14) is maximal.

3. Device according to claim 2, wherein the laser-active crystal (14) consists of Nd:YV0$_4$, Nd:GdVO$_4$, Nd:LSB, Nd:YA10$_3$, Nd.:YLF or Nd:BEL.

4. Device according to claim 2, wherein the laser-active crystal (14) consists of Nd:YV0$_4$ with neodymium doping of more than 0.5% (at.).

5. Device according to claim 2, wherein the optical element (4) is configured in the form of microoptics.

6. Device for the optical excitation of laser-active crystals, with a diode laser (1) which generates pump radiation (2), the laser-active crystal being arranged in a solid-state laser or solid-state laser amplifier and the laser-active crystal having an axis (C) with strong absorption and an axis (A) with weak absorption, comprising: an optical element (4) is arranged downstream of the diode laser (1) in order to achieve spatial shaping of the pump radiation from the diode laser (1) and in that the pump radiation (2) from the diode laser (1) is substantially polarised linearly in a privileged polarisation direction, and in that the polarisation direction of the pump radiation (2) is oriented parallel to the weak-absorption axis (A) of the laser-active crystal (14) when it is incident in the laser-active crystal (14); and wherein the optical element (4) is designed in the form of a polarisation-preserving waveguide, in order to achieve spatial shaping of the pump radiation (2) from the diode laser (1), the polarisation-dependent waveguide consisting, for example, of a glass rod or an optical fibre.

7. Device for the optical excitation of laser-active crystals, with a diode laser (1) which generates pump radiation (2), the laser-active crystal being arranged in a solid-state laser or solidstate laser amplifier and the laser-active crystal having an axis (C) with strong absorption and an axis (A) with weak absorption, comprising: an optical element (4) is arranged downstream of the diode laser (1) in order to achieve spatial shaping of the pump radiation from the diode laser (1) and in that the pump radiation (2) from the diode laser (1) is substantially polarised linearly in a privileged polarisation direction, and in that the polarisation direction of the pump radiation (2) is oriented parallel to the weak-absorption axis (A) of the laser-active crystal (14) when it is incident in the laser-active crystal (14);

wherein the second end face (14b) of the laser-active crystal (14) is assigned a reflector (52), which reflects the unabsorbed pump radiation (50) that was injected through the first end face (14a), and injects it into the second end face (14b) as reflected pump radiation (54); and wherein the laser-active crystal (14) has doping and a length which are selected so that less than 70% of the pump radiation (2) can be absorbed in the laser-active crystal (14) after entering through the first end face (14a).

8. Device according to claim 7, wherein approximately 50 to 60% of the pump radiation (2) can be absorbed in the laser-active crystal (14) after entering through the first end face (14a).

9. Method for the optical excitation of laser-active crystals with a diode laser (1), the laser-active crystal (14) being arranged in a solid-state laser or solid-state laser amplifier, comprising:

spatially shaping pump radiation (2) generated by the diode laser (1) with an optical element (4), the shaped pump radiation (2) having a polarisation direction, and projection onto a laser-active crystal (14), which has an axis (C) with strong absorption and an axis (A) with weak absorption, so that the polarisation direction of the pump radiation (2) is oriented parallel to the weak-absorption axis (A) of the laser-active crystal (14); and wherein the laser-active crystal (14) has at least a first and a second end face (14a, 14b) which have a polarisation-dependent transmission, and in that the polarisation direction of the pump radiation (2) is oriented so that the reflection losses at the first or second end faces (14a, 14b) are minimal and the optical power which enters the laser-active crystal (14) is maximal.

10. Method for the optical excitation of laser-active crystals with a diode laser (1), the laser-active crystal (14) being arranged in a solid-state laser or solid-state laser amplifier, comprising:

spatially shaping pump radiation (2) generated by the diode laser (1) with an optical element (4), the shaped pump radiation (2) having a polarisation direction, and projection onto a laser-active crystal (14), which has an axis (C) with strong absorption and an axis (A) with weak absorption, so that the polarisation direction of the pump radiation (2) is oriented parallel to the weak-absorption axis (A) of the laser-active crystal (14); and wherein the solid-state laser or solid-state laser amplifier comprises a laser resonator (27) with a multiplicity of mirrors (28, 29, 30), the surfaces of which are provided with polarisation-dependent transmission, and in that the polarisation direction of the pump radiation (2) is oriented so that the reflection losses at these surfaces are minimal and the optical power which enters the laser-active crystal (14) is maximal.

11. Method according to claim 10, wherein the laser-active crystal (14) consists of Nd:YV0$_4$, Nd:GdVO$_4$, Nd:LSB, Nd:YA10$_3$, Nd:YLF or Nd:BEL.

12. Method according to claim 10, wherein the laser-active crystal (14) consists of Nd:YV0$_4$ with neodymium doping of more than 0.5% (at.).

13. Method for the optical excitation of laser-active crystals with a diode laser (1), the laser-active crystal (14) being arranged in a solid-state laser or solid-state laser amplifier, comprising:

spatially shaping pump radiation (2) generated by the diode laser (1) with an optical element (4), the shaped pump radiation (2) having a polarisation direction, and projection onto a laser-active crystal (14), which has an axis (C) with strong absorption and an axis (A) with weak absorption, so that the polarisation direction of the pump radiation (2) is oriented parallel to the weak-absorption axis (A) of the laser-active crystal (14);

wherein pump radiation (52) emerging from the second end face (14b) of the laser-active crystal (14) is reflected by a a reflector (52), and re-enters the laser active crystal (14) as reflected pump radiation (54) through the second end face (14*b*); and wherein the laser-active crystal (14) has doping and a length which are selected so that less than 70% of the pump radiation (2) can be absorbed in the laser-active crystal (14) after entering through the first end face (14*a*).

14. Method according to claim 13, wherein approximately 50 to 60% of the pump radiation (2) is absorbed in the laser-active crystal (14) after entering through the first end face (14*a*).

* * * * *